United States Patent [19]

Sackmann et al.

[11] Patent Number: 4,771,097
[45] Date of Patent: Sep. 13, 1988

[54] TUB SIZES FOR PAPER

[75] Inventors: Günter Sackmann, Leverkusen; Ulrich Beck, Bornheim; Joachim König, Odenthal; Heinz Bäumgen; Klaus-Dieter Albrecht, both of Leverkusen, all of Fed. Rep. of Germany

[73] Assignee: Bayer Aktiengesellschaft, Leverkusen, Fed. Rep. of Germany

[21] Appl. No.: 26,340

[22] Filed: Mar. 16, 1987

[30] Foreign Application Priority Data

Mar. 25, 1986 [DE] Fed. Rep. of Germany ....... 3609981

[51] Int. Cl.$^4$ .............................................. C08L 35/02
[52] U.S. Cl. ..................................... 524/549; 526/272
[58] Field of Search ......................... 524/549; 526/272

[56] References Cited

U.S. PATENT DOCUMENTS

| 4,151,336 | 4/1979 | Sackmann | 526/272 |
| 4,152,312 | 5/1979 | Sackmann | 524/549 |
| 4,614,759 | 9/1986 | Sackmann et al. | 524/549 |

FOREIGN PATENT DOCUMENTS 0171727 2/1986 European Pat. Off. ............ 524/549

Primary Examiner—Paul R. Michl
Assistant Examiner—Lee C. Wright
Attorney, Agent, or Firm—Sprung Horn Kramer & Woods

[57] ABSTRACT

Tub sizes for paper, containing aqueous or aqueous-alcoholic alkali metal, amine or ammonium salt solutions of copolymers of maleic anhydride and diisobutylene and, if appropriate, a vinyl monomer of the formula

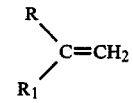

in which
R designates H, —CH$_3$, —C$_2$H$_5$, —OR$_2$, —O-COCH$_3$,

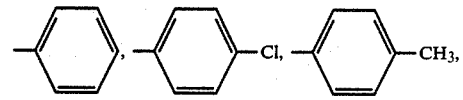

—CH$_2$OH or —CH$_2$—O—COCH$_3$,
R$_1$ designates H or —CH$_3$ and
R$_2$ designates alkyl, the anhydride groups of the copolymers being bis-esterified to the extent of about 3 to about 20 mol %, relative to the anhydride groups, with aliphatic monoalcohols having 1 to 12 C atoms.

11 Claims, No Drawings

TUB SIZES FOR PAPER

The invention relates to surface sizes for paper and paper-like materials, based on copolymers, partially bis-esterified with aliphatic monoalcohols, of maleic anhydride, diisobutylene and, if appropriate, a vinyl monomer, which sizes give an excellent sizing effect on paper grades of different composition and which, in sizing liquors containing starch, tend to foam only very little or not at all.

Admittedly, there are already a number of anionic surface sizes based on copolymers of maleic anhydride and diisobutylene in an alternating structure, such as are described in German Offenlegungsschriften Nos. 2,361,544, which corresponds to U.S. Pat. No. 4,152,759, 2,501,123 and 2,701,760 which corresponds to U.S. Pat. No. 4,151,336. These sizes show excellent sizing effects, but also have some technological disadvantages, for example their tendency to form foam under certain conditions in practice. This foam formation, which is frequently to be observed in the size press liquor, can have various causes; for example the water hardness, the nature of the starch used or equipment features of the paper machine. Although EP-A1-0,009,185 provides a teaching for the preparation of a low-foaming surface size for paper in the form of aqueous or aqueous-alcoholic alkali metal, amine or ammonium salt solutions of copolymers, containing carboxylic acid half-amide groups, of maleic anhydride and diisobutylene and/or terpolymers of maleic anhydride, diisobutylene and a vinyl monomer copolymerizing with maleic anhydride, it has been found in the practice of using this size that is foaming effect—albeit low—is nevertheless still too high in many cases.

According to German Offenlegungsschrift No. 3,419,961, which describes sizes based on copolymers of maleic anhydride, diisobutylene and, if appropriate, a vinyl monomer, which copolymers are partially bis-esterified with aliphatic monoalcohols to the extent of 25 to 90 mol %—relative to the anhydride groups—sizes are obtained which have a lower tendency to foam formation than that corresponding to the so far existing state of the art. The relatively high degree of esterification of 25 to 90 mol %, indicated there, can involve considerable technical disadvantages in the preparation and processing of the sizes: if, in the course of the preparation of the product, the esterified organic polymer solution is freed of the solvent—for example by stripping—the copolymer precipitates as a viscous mass which can be processed only with difficulty. A further disadvantage is the relatively high solution viscosity, caused by a high degree of esterification, of the finished aqueous size solutions.

These difficulties can now largely be avoided when, for the preparation of the sizes, a copolymer is used which is bis-esterified to the extent of about 3 to about 20 mol %, relative to the anhydride groups, with aliphatic monoalcohols. In fact, it has surprisingly been found that neither the sizing effect nor the advantageous foaming behaviour of the paper tub sizes are adversely affected by this low degree of esterification.

The present invention relates to surface sizes for paper and paper-like materials, such as cardboard or paperboard, which sizes contain aqueous or aqueous-alcoholic alkali metal, amine or ammonium salt solutions of copolymers of maleic anhydride and diisobutylene and, if appropriate, a vinyl monomer of the formula

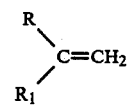

in which
R designates H, —CH$_3$, —C$_2$H$_5$, —OR$_2$, —O-COCH$_3$,

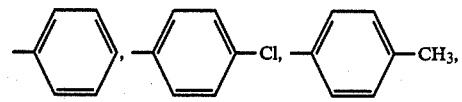

—CH$_2$OH or —CH$_2$—O—COCH$_3$,
R$_1$ designates H or —CH$_3$ and
R$_2$ designates alkyl, the anhydride groups of the copolymers being bis-esterified to the extent of about 3 to about 20 mol %, relative to the anhydride groups, preferably to the extent of about 10 to about 15 mol %, with aliphatic monoalcohols having 1–12 C atoms.

Preferably, the copolymers contain, side by side, structural units (II), (III) and (IV):

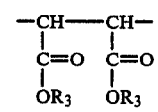   II

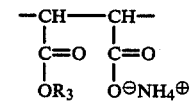   III

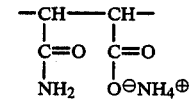   IV

R$^3$ represents a linear, branched or cyclic C$_1$–C$_{12}$-hydrocarbon radical.

Preferably, the molar ratio (II):(III):(IV) is 1:2–10:2–10, and particularly preferably 1:2–5:4–6.

The novel sizes are distinguished by the fact that, when used in the size press of a paper machine, they evolve little or no foam and at the same time have excellent sizing properties.

Although the half-ester products of the abovementioned copolymers are known as very effective sizes, they have a pronounced tendency to foam formation, which is clearly observable both in the preparation process and in their use on the paper machine. Due to the further reaction of the polymeric half-esters with a monoalcohol to give partial bis-esters, the foam formation of these substances is then greatly suppressed without impairment of their excellent sizing effect.

Examples of suitable vinyl monomers of the formula (I) for the preparation of the terpolymers are isobutylene, styrene, α-methylstyrene, allyl alcohol and isobutyl vinyl ether.

The preparation of the copolymers on which the new sizes are based is known from the literature.

Preferably, copolymers prepared by a free-radical method from 0.8–1.1 mol of maleic anhydride and 0.8–1.1 mol of diisobutylene or diisobutylene/vinyl monomer of the formula I, the mol data for diisobutylene relating to the 2,4,4-trimethylpent-1-ene content, are used.

Substances forming free radicals, such as, for example, peroxides, hydroperoxides, peresters, azo compounds and redox catalyst systems can be used for initiating this copolymerization.

The polymerization can be carried out unpressurized, in bulk or preferably in solution. If it is carried out in solution, those solvents are preferred in which both the monomers and the copolymers dissolve, for example aromatics such as benzene, toluene and halogenated aromatics such as chlorobenzene and chlorotoluene, lower ketones such as acetone and ethyl methyl ketone, esters of lower fatty acids such as ethyl acetate, chlorinated aliphatic hydrocarbons such as chloroform and carbon tetrachloride, ethers such as tetrahydrofuran, and highly polar solvents such as dimethylformamide or dimethyl sulphoxide. The polymerization temperature is between 20° and 150° C., and preferably between 30° and 120° C.

The following may be mentioned as examples of the monoalcohols to be used:

Methanol, ethanol, n-propanol, isopropanol, n-butanol, isobutanol, sec.-butanol, n-pentanol, isoamyl alcohol, n-hexanol, n-octanol, n-dodecanol, cyclohexanol and 2-ethylhexanol; n-butanol is preferred for use.

However, mixtures of these alcohols can also be used.

The reaction of the copolymers of maleic anhydride and diisobutylene or of the terpolymers of maleic anhydride, diisobutylene and a vinyl monomer of the formula (I) with the monoalcohol is carried out in solution or suspension in the presence of an entrainer for the water of reaction which is eliminated, such as, for example, benzene, toluene or xylene, at the boiling point of the particular entrainer. If low-boiling alcohols are used for the esterification, the reaction is carried out under pressure. The temperature range of the esterification reaction is in general between 80° and 170° C.

To accelerate the esterification reaction, acid catalysts such as, for example, sulphuric acid or p-toluenesulphonic acid, can be added to the reaction mixture in quantities of between 0.1 and 5% by weight, relative to the polymer employed.

In this case, p-toluenesulphonic acid in a quantity of between 0.5 and 2% by weight is preferred. However, when carrying out the esterification reaction, the procedure can also be such that initially a half-ester between the copolymer or terpolymer and the monoalcohol is formed and subsequently a part of the carboxyl groups is reacted to give the bis-ester with elimination of water by adding further monoalcohol together with the acid catalyst. The half-ester formation can here be carried out either in bulk, suspension or in a solvent at temperatures between 80° and 160° C., preferably at 100°–140° C. The subsequent bis-esterification is then carried out under the reaction conditions given above. The reaction time is between 4 and 24 hours. As rule, however, it is then regarded as having ended when water of reaction is no longer being eliminated.

Of course, it is also possible to copolymerize diisobutylene directly with a mixture of maleic acid half-ester and maleic acid bis-ester, which are obtainable by direct esterification of maleic anhydride with the corresponding monoalcohol, under the same conditions as are customary for the diisobutylene/maleic anhydride copolymerization, to give the corresponding copolymers.

Since the esterification of the maleic anhydride monomer units never takes place quantitatively and, therefore, carboxyl groups and, to a small extent, also cyclic anhydride groups always remain, the esterified copolymers and terpolymers can be converted into water-soluble salts by neutralization with aqueous alkali, ammonia or amine solutions.

The salt formation can be effected, for example, by means of the hydroxides of the alkali metals, such as sodium hydroxide and potassium hydroxide, ammonia or by primary, secondary or tertiary amines such as methylamine, dimethylamine, ethanolamine, triethylamine, diethanolamine or triethanolamine.

Since—as is evident from the IR spectrum—still unconverted anhydride units are also always present in the copolymers and terpolymers in addition to the half-ester and bisester groupings, the reaction with the aqueous alkali metal, ammonia or amine solutions also leads to the formation of half-amide/half-ammonium salts, which are like-wise water-soluble.

These aqueous solutions are outstandingly suitable as anionic, non-foaming paper sizes in the acidic and neutral range during the manufacture of alum-containing, alum-free, pre-sized and ligneous papers, which can contain various fillers such as kaolin, chalk and $TiO_2$.

In practice, a technical mixture of 2,4,4-trimethylpent-1-ene and 2,4,4-trimethylpent-2-ene is used for the preparation of the maleic anhydride/diisobutylene copolymers, the pent-1-ene compound reacting predominantly to give high-molecular copolymers.

In a preferred embodiment of the invention, the sizes are employed as aqueous solutions in a mixture with urea and urea derivatives. As a result of this blending, an additional effect which intensifies the sizing, and a pronounced reduction in the solution viscosity of the sizes according to the invention are obtained. Preferably those urea derivatives are used in which one or both nitrogen atoms are substituted by $C_1$–$C_4$-alkyl groups or $C_1$–$C_4$-hydroxyalkyl groups such as, for example, hydroxymethyl groups. Dimethylurea, tetramethylurea and dimethylolurea may be mentioned as examples of such derivatives. The quantity of added urea or urea derivatives is here in general 10 to 200% by weight, preferably 20 to 100% by weight, relative to the weight of the alkali metal, ammonium and amine salts or to the half-amide/half-ammonium salts of the copolymers or terpolymers based on maleic anhydride and diisobutylene and partially bis-esterified with monoalcohols.

The concentration of these polymers in the aqueous size solution can be greatly reduced by the addition of urea or urea derivatives to the polymer solutions, the same sizing effect being achieved as can be obtained only at considerably higher concentrations when the polymers are used alone. The addition of urea thus has the effect that, for example, the quantity of water-soluble salt of the partially bis-esterified copolymers and terpolymers in the size solution can be greatly reduced, without the excellent sizing properties of the products being adversely affected.

The surface sizes, according to the invention, for paper can be used in all processing methods usual for tub sizing in papermaking. The sizes can be applied both alone and in combination with plastics dispersions. They are not susceptible to foam-promoting effects such as, for example unfavourable equipment conditions and high degrees of hardness of the water used in papermaking, so that the surface sizes for paper can be used virtually everywhere without foam formation, which interferes with the production process, and without an addition of antifoams. The products according to the invention are suitable, either alone or in combination with sizes added to the paper stuff, for tub sizing of most of the usual paper grades such as, for example alum-containing, alum-free, kaolin-filled, chalk-filled, $TiO_2$-filled, neutral, acidic, unsized, presized, ligneous and wastepaper-containing papers.

The percentage data in the examples which follow always relate to the weight.

EXAMPLES

Preparation of surface size I for paper

A solution of 3,998 g of maleic anhydride in 5,100 g of toluene is first introduced into a 40 l steel autoclave fitted at the top with a device for separating off water, with facilities for returning solvent into the kettle. The reactor is then flushed with nitrogen and the internal temperature is raised to 100° C. With continued introduction of nitrogen, 6,528 of diisobutylene (technical mixture of 2,4,4-trimethylpent-1-ene and 2,4,4-trimethylpent-2-ene) and a solution of 128 g of azobisisobutyronitrile (AIBN) in 2,500 g of toluene are pumped simultaneously into the autoclave in the course of 4 hours by means of two metering pumps. After the metering-in has been completed, stirring is continued for a further 6 hours at 100° C., and 306 g of isobutylene and a solution of 38 g of t-butyl per-2-ethylhexanoate in 306 g of toluene are then added in the course of 30 minutes, likewise simultaneously. Stirring is then continued for a further two hours at 100° C. and the kettle temperature is then raised to such a level that the solvent starts to boil. About 3,000 g of a solvent mixture, the main constituent of which is 2,4,4-trimethylpent-2-ene, is then removed from the reactor via the water separator apparatus.

After removal of the distillate, a solution of 3,019 of n-butanol and 75 g of p-toluenesulphonic acid in 2,000 g of toluene is then introduced via a replenishing vessel, and the temperature is raised until the reaction mixture boils vigorously, water of reaction being separated off azeotropically. The solvent distilling off simultaneously with the water is always returned into the autoclave. After 12 hours at the boiling point, the separation of water has ended. The autoclave is then cooled to 70° C., and 50 g of triethylamine are added.

It is calculated from the quantity of water eliminated that the polymer contains about 11 mol % of bis-ester units (II), and IR-spectroscopic investigations show that it contains about 50 mol % of mono-ester units (III). The difference from 100% allows a conclusion regarding the quantity of units (IV).

The resulting polymer solution is introduced continuously into a 100 l stirred kettle which is fitted with a top cooler and which contains a solution, warmed to 60° C., of 5,100 of urea in 51,000 g of water. While the solvent distils off under a vacuum of about 100 mbar, the polymer precipitates as a fine white powder. When solvent no longer passes over, the precipitated product is dissolved by adding 4,300 g of an aqueous ammonia solution and is freed of solvent and monomer residues by degassing in vacuo. The polymer solution obtained is adjusted to a solids content of 20.8% by weight by dilution with water.

Viscosity: 107 mPas (20° C.).

This aqueous solution can be used directly for the surface sizing of paper.

Size II:

By substituting isoamyl alcohol for n-butanol, size II is obtained which contains about 11 mol % of bis-ester units (II) and about 40 mol % of mono-ester units (III).

The application examples which follow are intended to demonstrate the low foaming tendency of the sizes according to the invention.

0.4% by weight of active substance are dissolved in a sizing liquor consisting of 5% by weight of commercially available starch (Perfectamyl A 4692 ®) and the solution is warmed to 60° C. 200 ml of this sizing liquor are passed from an aluminum vessel, which has a circular orifice of 4 mm diameter (Ford cup) on its underside, from a height of 60 cm in free fall into a graduated beaker. The volume, in ml, of the foam forming above the surface of the liquid is determined once immediately and also after standing for 1 minute in air. The first value provides information on the tendency of the size to foam formation and the second value gives information on the rapidity of degradation of the foam or its stability.

| Size | foam volume in ml | |
|---|---|---|
| | immediately | after 1 minute |
| Size I according to the invention | 80 | 60 |
| Size II according to the invention | 60 | 30 |
| Size according to German Offenlegungsschrift 3,429,961 (U.S. Pat. No. 4,614,759) | 90 | 70 |
| Size according to German Offenlegungsschrift 2,361,544 (U.S. Pat. No. 4,152,312) | 200 | 160 |
| Size according to European Patent 0,009,185 | 150 | 120 |

This compilation clearly shows that the sizes according to the invention show the same advantageous foaming behaviour as the product obtained according to German Offenlegungsschrift No. 3,429,961 (U.S. Pat. No. 4,614,759).

The sizing effect of the sizes according to the invention was tested on three different types of paper, which had the following compositions:

Alum-containing paper:
50% of softwood pulp, 50% of hardwood pulp, 1% of alum, 11.2% of clay ash, pH value in the headbox: 4.4; water adsorption: about 80%; weight of the paper: 80 g/m².

Pre-sized paper:
50% of softwood pulp, 50% of hardwood pulp, 1% of alum, 0.1% of bewoid size, 11.1% of clay ash, pH value in the headbox: 4.5; water adsorption: about 70%; weight of the paper: 80 g/m².

Ligneous paper:
40% of softwood pulp, 60% of mechanical wood pulp, 14.1% of clay ash, pH value in the headbox: 4.5; water adsorption: about 50%; weight of the paper 75 g/m².

The sizing of the papers was carried out on an HF type laboratory size press from Messrs. Mathis, Zurich, Switzerland. The sizing liquor used was a solution of 5% by weight of commercially available starch and 0.13, 0.16 and 0.20% by weight of the size to be tested (to be calculated as 100% active substance) in 94.87, 94.84 and 94.80% by weight of water.

The surface-sized papers were dried on a drying cylinder within one minute at about 100° C. Before the sizing test, the papers were conditioned at room temperature for 2 hours.

To assess the sizing degree of the tub-sized papers, the Cobb values (according to DIN 53 132) were determined.

The table which follows gives the Cobb values of the sizes according to the invention on three different types of paper and with two different amounts used. In order to prove that, in spite of the substantially lower bis-ester content as compared with the size according to German Offenlegungsschrift No. 3,429,961, (U.S. Pat. No. 4,614,759) the sizing effect of the products has not deteriorated, the Cobb values for a size prepared according to German Offenlegungsschrift No. 3,429,961 (U.S. Pat. No. 4,614,759) are also reproduced in the table, in addition to the Cobb values for the sizes I and II.

| Type of paper | Cobb value in g/m² for an addition of | |
|---|---|---|
| | 0.20% | 0.25% |
| *Size I* | | |
| alum-containing | 25.1 | 24.0 |
| pre-sized | 23.8 | 23.2 |
| ligneous | 23.1 | 21.5 |
| *Size II* | | |
| alum-containing | 25.5 | 24.3 |
| pre-sized | 24.7 | 23.9 |
| ligneous | 24.4 | 23.8 |
| *Size according to German Offenlegungsschrift 3,429,961* | | |
| alum-containing | 24.7 | 24.1 |
| pre-sized | 26.6 | 25.7 |
| ligneous | 22.3 | 21.7 |

We claim:

1. A surface size for paper, containing aqueous or aqueous-alcoholic alkali metal, amine or ammonium salt solution of copolymers of maleic anhydride and diisobutylene, the anhydride groups of the copolymers being bis-esterified to the extent of about 3 to about 2 mol%, relative to the anhydride groups, with aliphatic monoalcohols having 1 to 12 C atoms.

2. A surface size according to claim 1, wherein the monoalcohol is selected from methanol, ethanol, n-propanol, isopropanol, isobutanol, sec.-butanol, n-pentanol, isoamyl alcohol, n-hexanol, cyclohexanol, n-octanol, n-dodecanol or 2-ethylhexanol or mixtures thereof.

3. A surface size according to claim 1, wherein the monoalcohol is n-butanol.

4. A surface size according to claim 1, wherein the size contains urea or urea derivative.

5. A surface size according to claim 1, wherein the size contains urea or a urea derivative which is N-monosubstituted or N-disubstituted by $C_1$-$C_4$-alkyl or $C_1$-$C_4$-hydroxyalkyl.

6. A surface size according to claim 1, wherein the size contains 10-200% by weight of urea or urea drivative, relative to the weight of the alkali metal, amine or ammonium salts.

7. A surface size according to claim 6, wherein the size contains 20-100% by weight of urea or urea derivative, relative to the weight of alkali, metal, amine or ammonium salts.

8. A surface size according to claim 1, which contains a vinyl monomer of the formula

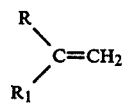

in which

R represents H, —$CH_3$, —$C_2H_5$, —$OR_2$, —O-$COCH_3$,

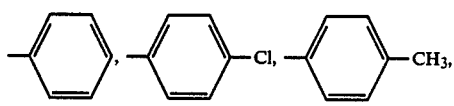

—$CH_2OH$ or —$CH_2$—O—$COCH_3$;

$R_1$ represents H or —$CH_3$ and
$R_2$ represents alkyl.

9. A surface size according to claim 8, wherein the vinyl monomer is isobutylene, styrene, α-methylstyrene, allyl alcohol or isobutyl vinyl ether.

10. A surface size according to claim 8, wherein the size contains, side by side, structural units

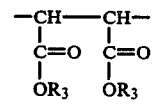   II

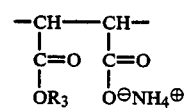   III and

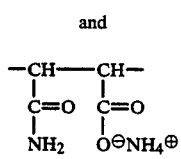   IV wherein $R^3$ represents a linear, branched or cyclic $C_1$-$C_{12}$-hydrocarbon radical.

11. A surface size according to claim 9, wherein a molar ratio of (II):(III):(IV)=1:2–10:2–10.

* * * * *

UNITED STATES PATENT AND TRADEMARK OFFICE
CERTIFICATE OF CORRECTION

PATENT NO. : 4,771,097
DATED : Sep. 13, 1988
INVENTOR(S) : Sackmann et al.

It is certified that error appears in the above-identified patent and that said Letters Patent is hereby corrected as shown below:

Col. 7, line 41   Delete "3" and "2" and substitute --10-- and --20--, respectively
Col. 7, line 53   Insert --a-- after "contains"
Col. 8, line 55   Delete "9" and substitute --10--
Col. 8, line 55   Delete "a" and substitute --the--.

Signed and Sealed this

Twenty-seventh Day of June, 1989

Attest:

DONALD J. QUIGG

Attesting Officer    Commissioner of Patents and Trademarks